US008043094B2

(12) United States Patent
Bahler

(10) Patent No.: US 8,043,094 B2
(45) Date of Patent: Oct. 25, 2011

(54) MODEL AND METHOD FOR SIMULATING WATER TREATMENT

(75) Inventor: Carlene T. Bahler, Alexandria, VA (US)

(73) Assignee: JT & A, Inc., Chantilly, VA (US)

( * ) Notice: Subject to any disclaimer, the term of this patent is extended or adjusted under 35 U.S.C. 154(b) by 1207 days.

(21) Appl. No.: 11/456,463

(22) Filed: Jul. 10, 2006

(65) Prior Publication Data

US 2008/0020360 A1    Jan. 24, 2008

(51) Int. Cl.
*G09B 23/00* (2006.01)
(52) U.S. Cl. .......................... 434/276; 434/150; 434/429
(58) Field of Classification Search ................ 210/739, 210/919, 920, 170.08, 170.09, 170.1; 434/150, 434/151, 276, 429; 700/273; 703/6, 7, 9; 706/920; 405/36, 37
See application file for complete search history.

(56) References Cited

U.S. PATENT DOCUMENTS

| | | | | |
|---|---|---|---|---|
| 4,066,542 A * | 1/1978 | Ayukawa | ...................... | 210/724 |
| 4,095,350 A | 6/1978 | Wanderman | .................... | 434/72 |
| 4,097,377 A * | 6/1978 | Ayukawa | ...................... | 210/721 |
| 4,214,962 A * | 7/1980 | Pincon | ..................... | 204/157.44 |
| 4,629,430 A | 12/1986 | Sakamoto | ..................... | 434/219 |
| 4,687,574 A * | 8/1987 | Hellman | ...................... | 210/151 |
| 5,348,478 A * | 9/1994 | Bradshaw | ..................... | 434/150 |
| 5,427,530 A * | 6/1995 | Taggart | ......................... | 434/276 |
| 5,505,862 A * | 4/1996 | Sonnenrein | ................... | 210/608 |
| 5,616,240 A * | 4/1997 | Sonnenrein | ................... | 210/104 |
| 6,379,545 B1 * | 4/2002 | Perslow et al. | ............... | 210/605 |
| 2003/0132167 A1 * | 7/2003 | Haase | .......................... | 210/696 |

FOREIGN PATENT DOCUMENTS

| | | | |
|---|---|---|---|
| FR | 2564453 | 11/1985 | |
| GB | 2007637 | 5/1979 | |
| GB | 2007637 A | * | 5/1979 |
| GB | 2392909 A | * | 3/2004 |
| JP | 2003-15520 | 1/2003 | |
| JP | 2006-75749 | 3/2006 | |

OTHER PUBLICATIONS

PCT International Search Report and Written Opinion, issued in International Application No. PCT/US2007/072900, dated Dec. 4, 2007.
"EnviroScape User's Guide: Coastal," 2004.
"EnviroScape User's Guide: Groundwater," 2003.
"EnviroScape User's Guide: Hazardous Waste," 2001.
"EnviroScape User's Guide: Waste Management (Landfill & Recycling)," 2003.
"EnviroScape User's Guide: Wetlands," 2006.

* cited by examiner

*Primary Examiner* — Duane Smith
*Assistant Examiner* — Paul J. Durand
(74) *Attorney, Agent, or Firm* — Fulbright & Jaworski LLP

(57) ABSTRACT

A portable model and methods for simulating water treatment processes are presented. Included are a body of untreated drinking water, simulated sources of wastewater, and simulated drinking and wastewater treatment plants. In the simulated drinking water treatment plant, water is treated and stored for distribution though a simulated pipeline system. In the simulated wastewater treatment plant, simulated wastewater is filtered, settled, clarified, disinfected and discharged. The simulated wastewater may be transferred to the simulated wastewater treatment plant through a simulated sewage pipeline network. Simulated biosolids as a result of the wastewater treatment process may be stored or applied to land. The model may also simulate a storm drain system that diverts storm water to a water source or to the wastewater treatment plant. The materials used to simulate the various aspects and components are preferably non-toxic, non-poisonous and biodegradable in order to facilitate use with children and clean up.

20 Claims, 5 Drawing Sheets

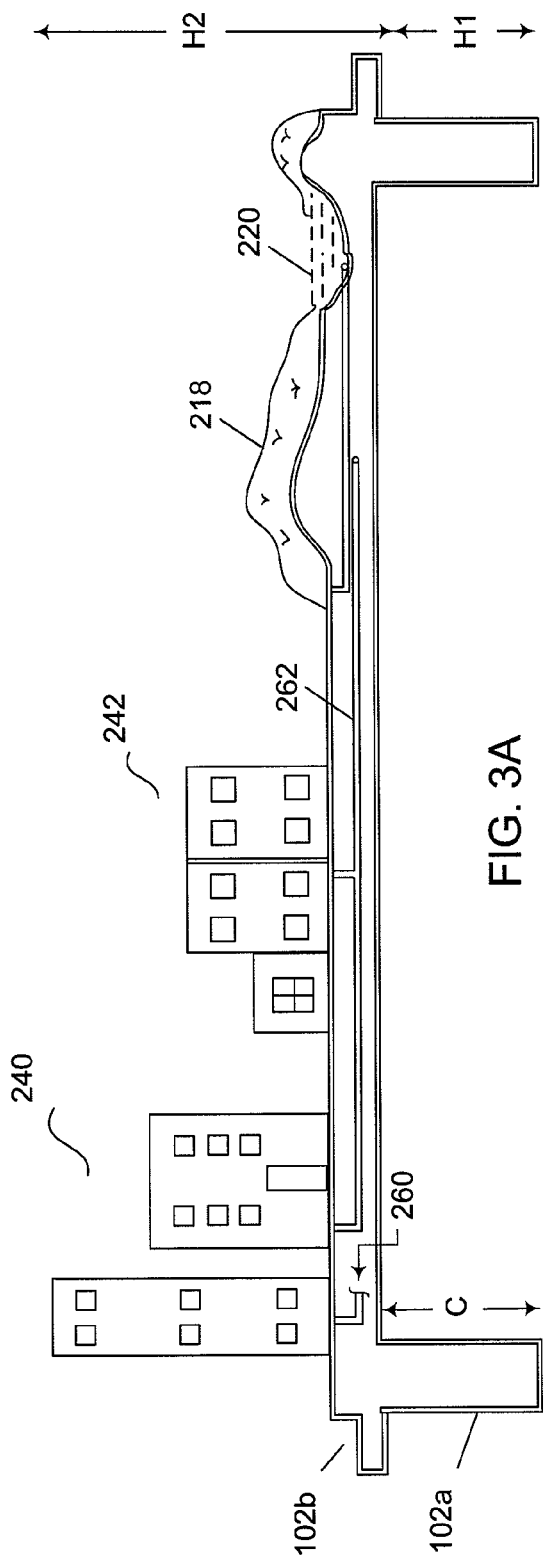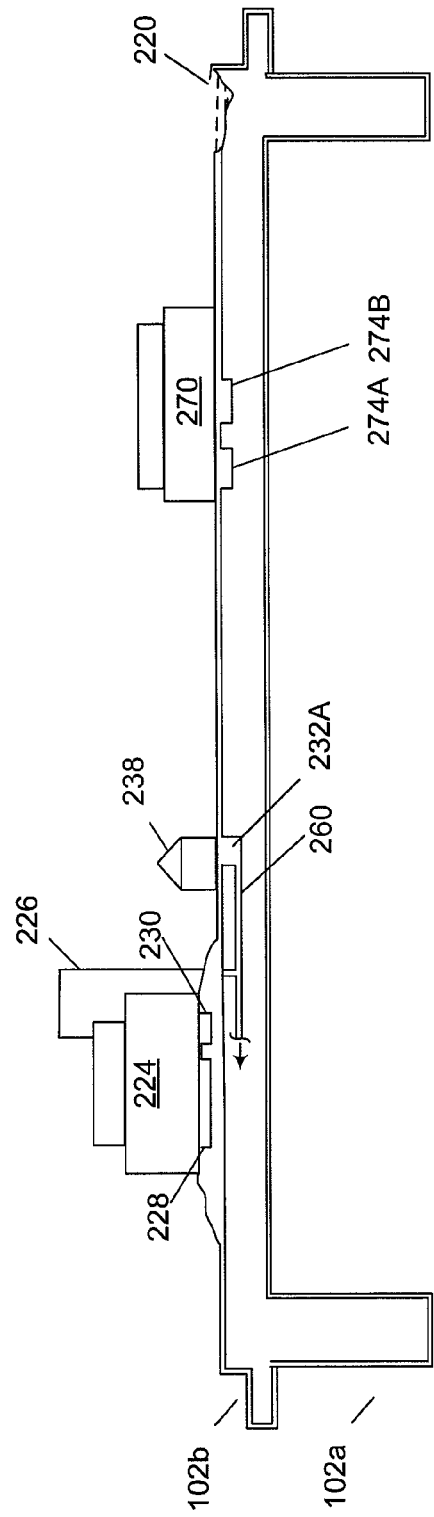

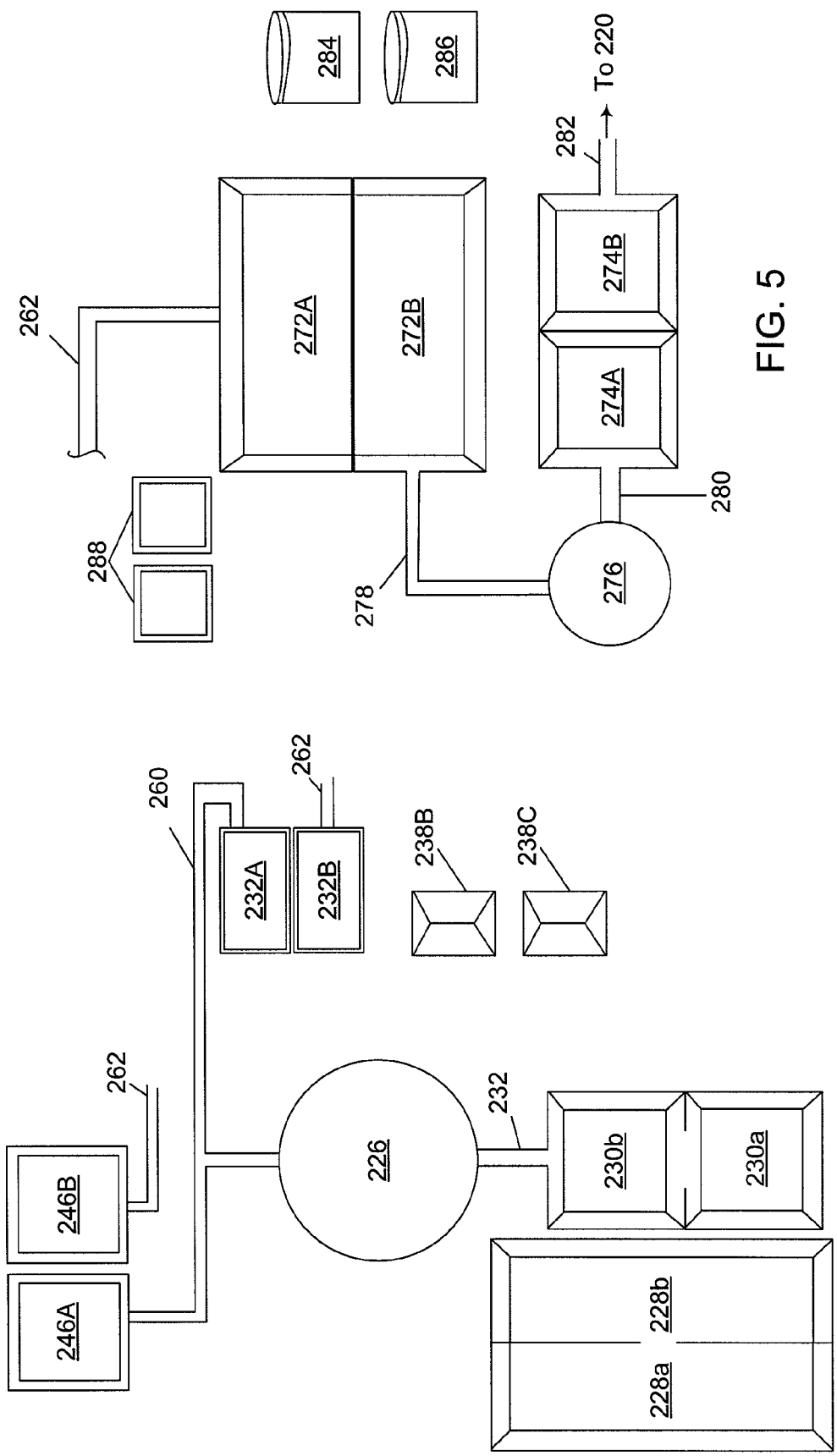

MODEL AND METHOD FOR SIMULATING WATER TREATMENT

BACKGROUND OF THE INVENTION

1. Field of the Invention

The present invention relates generally to simulating and demonstrating water treatment. More particularly, the present invention involves simulation and demonstration of drinking water treatment and wastewater treatment and disposal.

2. Description of Related Art

The treatment of water, and in particular wastewater, generally involves chemical and biological processes which treat and remove physical, chemical, and biological contaminants. The results from these processes produce a treated and clean waste stream for discharge or recycling for environmental purposes, and solid waste (known as sludge) that can also be disposed or recycled.

The treatment of wastewater may occur on-site at the source using, for example, septic tanks or onsite treatment plants. Alternatively, the wastewater may be collected and transported via a pipeline network to a municipal treatment plant. Typically, the treatment of wastewater begins with the removal of solids from the waste stream. Next, a conversion process converts dissolved biological matter into a solid biological mass using water-borne bacteria. Once the biological solids are separated and removed, the treated water may undergo a chemical disinfection. This resultant treated water may subsequently be discharged or recycled back into the environment (e.g., bodies of water, wetlands, green ways, and the like). The segregated biological solids can receive additional treatment and neutralization prior to proper disposal or recycled.

Similarly, the treatment of raw water (e.g., groundwater, lake water, reservoirs, rain water, etc.) to produce drinking water also includes the removal of chemical and biological contaminants. For example, water pollutant sources such as chemicals, metal, bacteria, algae, viruses, fungi, and the like may be removed through various stages using filters, coagulation, flocculation, and membranes. Next, chemical processes may be performed to adjust the pH value, remove any taste or smell, and disinfect. After the treatment processes, the drinking water is stored and/or delivered to residential, commercial, and industrial areas.

Water treatment models are useful to demonstrate graphically sources of drinking water, treatment of water (e.g., drinking water and wastewater), the manipulation of water through pipeline networks, and the disposal of treated wastewater. The models are useful either as a simulation of water treatment processes, or as a teaching tool to create awareness and understanding of water treatment techniques, particularly in schools and other teaching environments. Prior water treatment models have not been effective in graphically showing sources of water, the treatment of wastewater and drinking water, and the disposal of treated wastewater. In addition, prior water treatment models have been cumbersome, unwieldy, and not portable.

SUMMARY OF THE INVENTION

The present disclosure provides methods and a portable model for simulating and demonstrating water treatment processes and wastewater treatment processes.

More specifically, a portable water treatment model is presented, including a simulated water source, a simulated drinking water treatment plant for simulating treatment of water from the simulated water source, and a simulated wastewater treatment plant coupled to the simulated drinking water treatment plant for simulating treatment of wastewater. The model and method may further include a simulated pipeline network coupled to the simulated drinking water treatment plant to simulate distribution of treated drinking water, and coupled to the simulated wastewater treatment plant to simulate collection of wastewater.

In accordance with aspects of the disclosure, the simulated drinking water treatment plant may include a number of different drinking water treatment sections, which may be a simulated settlement tank, a simulated clarifier tank and/or a simulated chlorination basin. A simulated water storage facility in the form of a water tower or reservoir may also be included, as may a simulated pipeline network to simulate distribution of treated drinking water.

In accordance with other aspects of the present disclosure, the simulated wastewater treatment plant may be a municipal sewage treatment plant, a private sewage treatment plant or a septic system, and may include a number of different wastewater sections including filtering, settlement, separating, aerating, clarifying and disinfection. Further, a simulated sewage pipeline network may be coupled to the simulated wastewater treatment plant to simulate collection of wastewater from various sources.

Also presented are methods for simulating water treatment processes, including, providing at least one simulated body of untreated drinking water, providing a simulated drinking water treatment plant, transferring water from the simulated body of untreated drinking water to the simulated drinking water treatment plant, simulating drinking water treatment to produce a simulated treated water source, and simulating storage of the simulated treated water source. The simulated drinking water treatment may include simulating settlement, coagulation, filtering, and disinfection processes.

In accordance with other aspects of the present disclosure, a method for simulating wastewater treatment processes is presented, including providing at least one simulated source of wastewater, providing a simulated wastewater treatment plant, transferring simulated wastewater from the at least one simulated source of wastewater to the wastewater treatment plant, simulating filtering for removing solids in the simulated wastewater to produce simulated filtered wastewater, simulating settling of the simulated filtered wastewater to produce simulated separated wastewater and simulated sludge, simulating clarification of the simulated separated wastewater to produce simulated clarified wastewater, and simulating disinfection of the simulated clarified wastewater to produce simulated treated wastewater. Further, aeration may be simulated within the simulated wastewater treatment plant, as may discharging the simulated treated wastewater into a simulated body of water. Further yet, the transferring step may include passing the simulated wastewater from the simulated source of wastewater to the simulated wastewater treatment plant through a simulated sewage pipeline network.

In the methods and model of the present disclosure, the various simulated components may be realized using non-toxic substances in order to facilitate clean up after demonstration and use with children.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment the term substantially refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The figures are examples only. They do not limit the scope of the invention.

FIGS. 3A and 3B are cross-sectional views of a portable water treatment model, in accordance with embodiments of the disclosure.

FIG. 4 is a top view of different sections of a water treatment plant, in accordance with embodiments of the disclosure.

FIG. 5 is a top view of different sections of a wastewater treatment plant, in accordance with embodiments of the disclosure.

DESCRIPTION OF ILLUSTRATIVE EMBODIMENTS

The disclosure and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

The present disclosure provides a portable water treatment model. In one respect, the model provides simulating sources of drinking water and simulating the treatment of water prior to delivery for residential, commercial, and industrial usage. In other respects, the model provides for simulating treatment of wastewater from multiple sources. The simulation may include local treatment at the source of the wastewater (e.g., local treatment plant or septic tank). In addition or alternatively, the simulation may include the collecting of the wastewater and treatment of the wastewater at an off-location site (e.g., municipal area).

Portable Simulated Water Treatment Model

Figure 1:
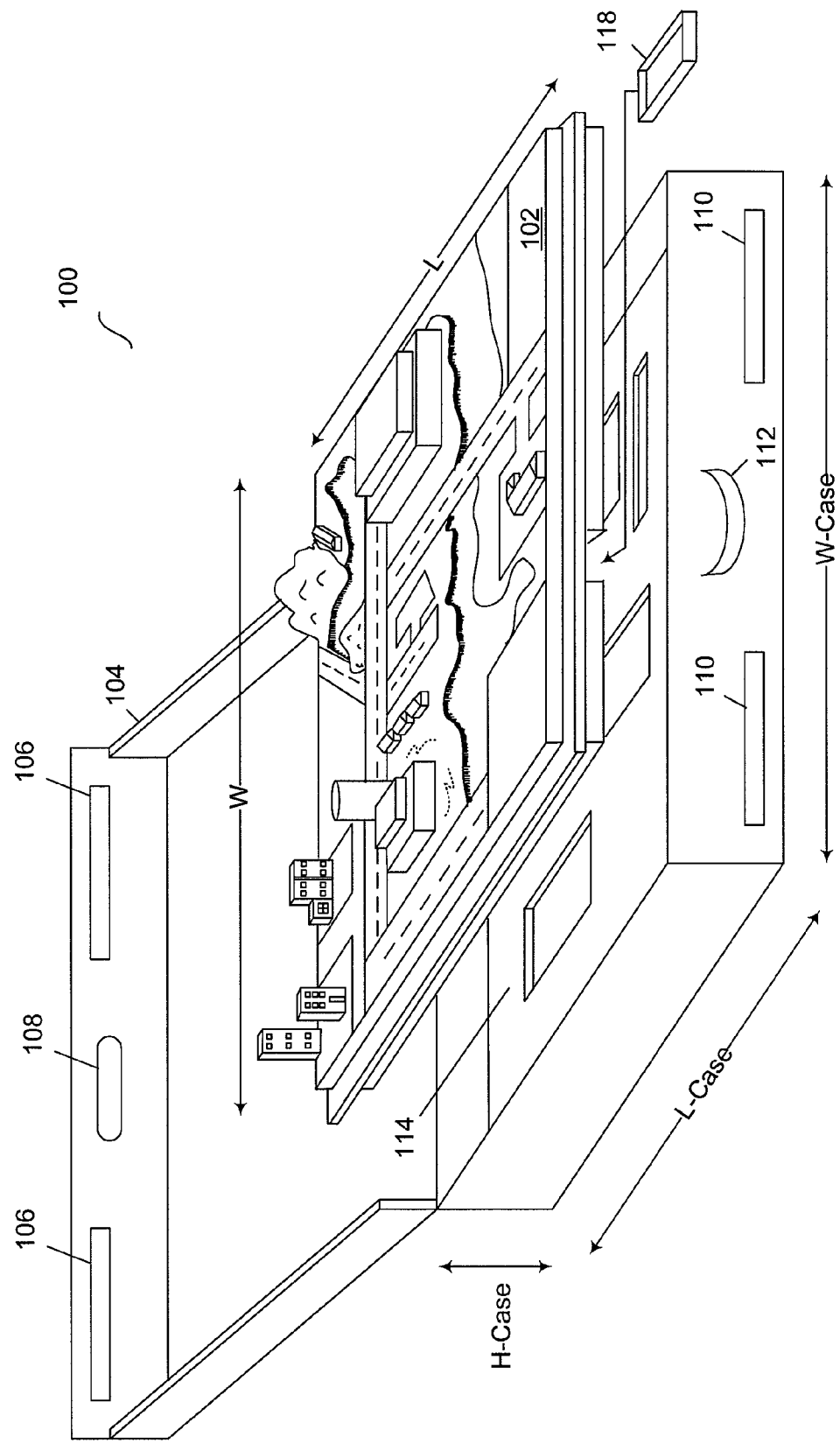
FIG. 1 is a perspective view of a portable water treatment model and carrying case, in accordance with embodiments of the disclosure.

Referring to FIG. 1, a perspective view of a portable water treatment model according to embodiments of the present disclosure is shown. The portable nature of the present disclosure enhances its usefulness as a water treatment model to demonstrate graphically sources of drinking water, process to generate drinking water, delivering drinking water for consumption, wastewater treatment process, and the disposal of biosolids. The present disclosure may be used as a teaching tool to create awareness and understanding of water sources, water pollutants, and water treatment techniques. In certain embodiments, the present disclosure uses readily available non-toxic substances to simulate various waste and other substances common in water treatment facilities, thus facilitating use of the model with children. Additionally, the present disclosure model may be used, cleaned, transported to a different location, and used again with relative ease.

In one embodiment, model 100 may include simulated water treatment model 102 and portable carrying case 104. The length, L, and width, W, of the portable simulated water treatment mode 102 are approximately 30 inches in length and about 24 inches in width, although one of ordinary skill in the art will recognize that other dimensions may also be acceptable.

Portable carrying case 104 may be provided to allow for easier movement of portable simulated water treatment model 102. In some respects, case 104 may be fitted with wheels (not shown) to assist in transporting model 102. The portable carrying case may be made of a cardboard material. Alternatively, the portable carry case may be a heavy-duty plastic carry case. In yet another alternative, model 102 may be carried in a duffel bag (not shown) with a carrying handle and/or shoulder strap as appropriate.

In one embodiment, the length L-case, width W-case and height H-case of the portable carrying case may be approximately 31 inches, 25 inches and 7 inches, respectively, although other dimensions are acceptable. One of ordinary skill in the art would recognize that the dimensions of case 104 may be adjusted to accommodate a particular model.

Carrying case 104 may include a lid including fasteners 106 and opening 108 for securing the lid in a closed position. In one embodiment, fasteners 106 may be secured with corresponding fasteners 110 on carry case 104. Fasteners 106 and 110 may include, without limitation, hook and loop fasteners, magnets, snaps, buttons, latches, ties, and the like. Insert 114, made of a moldable material, such as foam material, may be included in the carrying case 104, and may be contoured to hold various items. For example, insert 114 may include cut-outs for securing components of the model. Instruction manuals, containers for holding moveable features, simulated contaminants and treatment components, fluid dispensers, and the like may be secured in insert 114.

In some embodiments, carrying case 104 may include handle 112 which extends through opening 108 of the lid to allow easy carrying. Alternatively, handle 112 may be integrated into the lid of carrying case 104. In other embodiments, carry case 104 does not include a handle for ease of mobility and storage. Carrying case 104 may simply closed and fastened using, for example, fasteners 106 and 110.

In addition to or alternatively, carry case 104 may be inserted into a duffle bag (not shown). The duffle bag may be equipped with wheels and/or may be fitted with handles and/or shoulder straps for ease of transport.

In some embodiments, case 104 and model 102 may be integrally formed. As such, upon a simulation or demonstration, case 104 may be opened revealing model 102. Insert 114, and in particular, instruction manuals, containers for holding moveable features, simulated contaminants and treatment components, fluid dispensers, and the like may accessible via compartments built into case 104.

Model 102 with case 104 or a duffel bag may weigh, for example, in the range of 10 to 15 pounds, although other weights would also be acceptable as long as the model remains reasonably portable.

In some embodiments, simulated water treatment model 102 may include multiple layers, 102a and 102b (collectively referred to as 102), as shown in FIGS. 3A and 3B. First layer 102a may have an inverted "U" shape and may be used to catch water from second layer 102b. In addition, first layer 102a may be a groundwater source layer where water in this layer may be drawn through layer 102b to simulate groundwater sources. First layer 102a may have a bottom clearance, C, of approximately three inches and a height, H1, of approximately 3 inches. Second layer 102b, coupled to first layer 102a may be the simulated water treatment layer and may have height, H2, of approximately two and a half to three inches. The total height of model 102 (including layers 102a and 102b) may be about six inches. Of course, other dimensions would also be acceptable as long as model 102 remains reasonably portable.

Simulated water treatment model 102 may made of a durable material that is capable of being easily cleaned for reuse. In one embodiment, simulated water treatment model 102 and portable carrying case may be made from a lightweight material to make it portable. For example, water treatment model 102 may be made of a PETG plastic (or glycolised polyster) having a thickness of between approximately 0.050 and 0.125 inches (1.3-3.2 mm). The model may be constructed using a vacuum thermoforming technique in which a sheet of PETG is placed in a frame and heated to a forming temperature of approximately 200° F. (94° C.). Next, a mold may be plunged into the frame so as to create a substantially airtight seal on the outer edges of the mold. A vacuum is then applied, and the PETG conforms to the shape of the mold. After cooling, the formed part may be removed from the frame and appropriate finish trimming is accomplished by die-cutting or routing.

In one embodiment, a silicone female mold may be created from a master mold, which was constructed out of a wood block carved mold or resin-made material. Next, a tooling resin may be used to cast a male vacuum forming mold from the silicone female mold. Vacuum holes may be placed in the male mold so that the PETG would retain as much of the mold detail as possible.

Prior to vacuum forming, the color features may be screen printed on the PETG sheet. After the vacuum forming process, the colors may register to the appropriate topographical features of the model. In one embodiment, the screen printed inks may be applied to the inside of the model, leaving only clear PETG on the working surface, thus protecting the colors during use or transport.

Alternatively, color may subsequently be applied to the model by spray painting through stencils, the stencils also being created using the vacuum forming process. The stencils may be overlaid upon the model for each paint color, and color is applied by spray painting through the stencil. The model may then be clear coated to improve wear resistance.

Figure 2A:
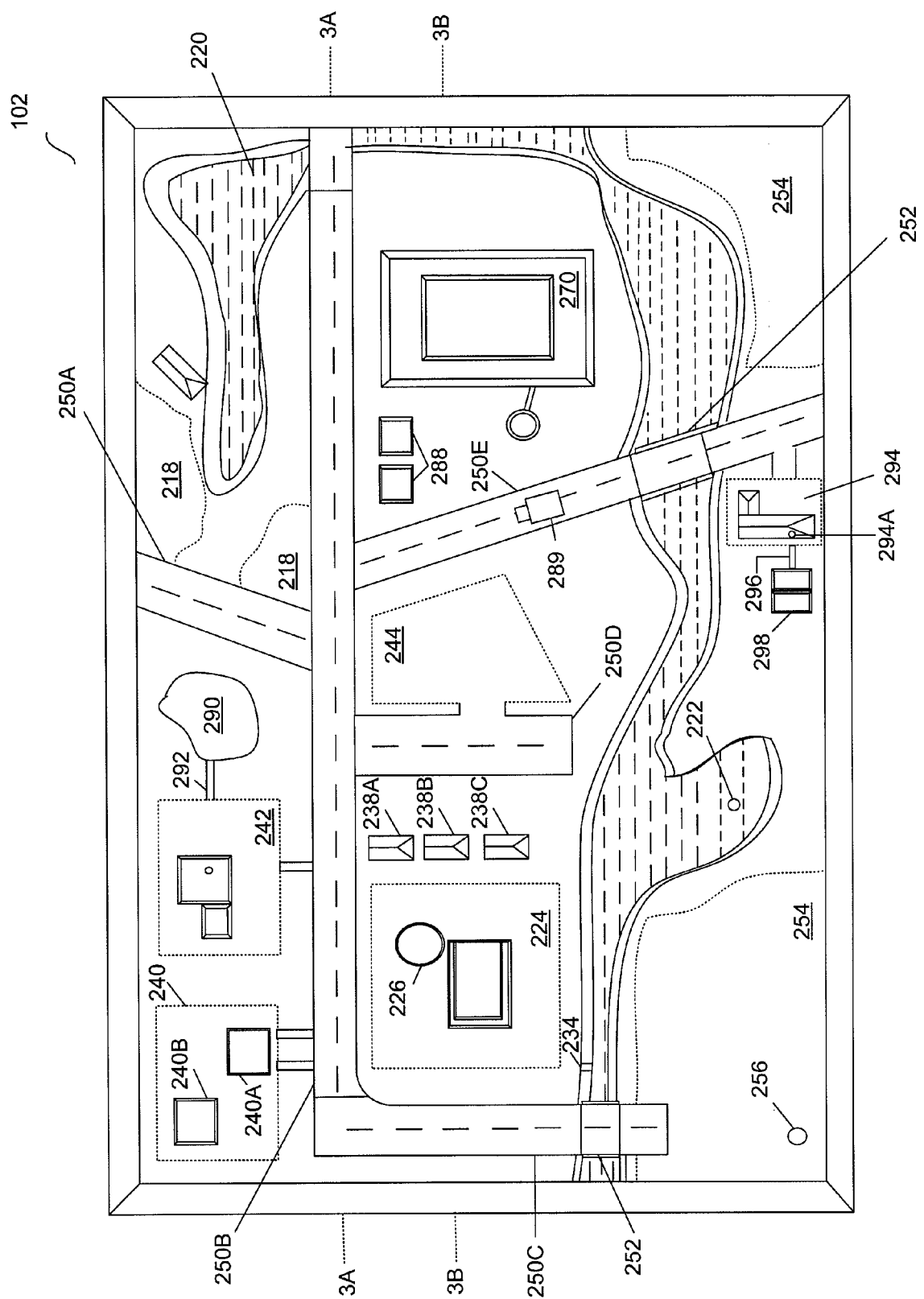
FIGS. 2A and 2B are top views of a portable water treatment model, in accordance with embodiments of the disclosure.
Figure 2B:
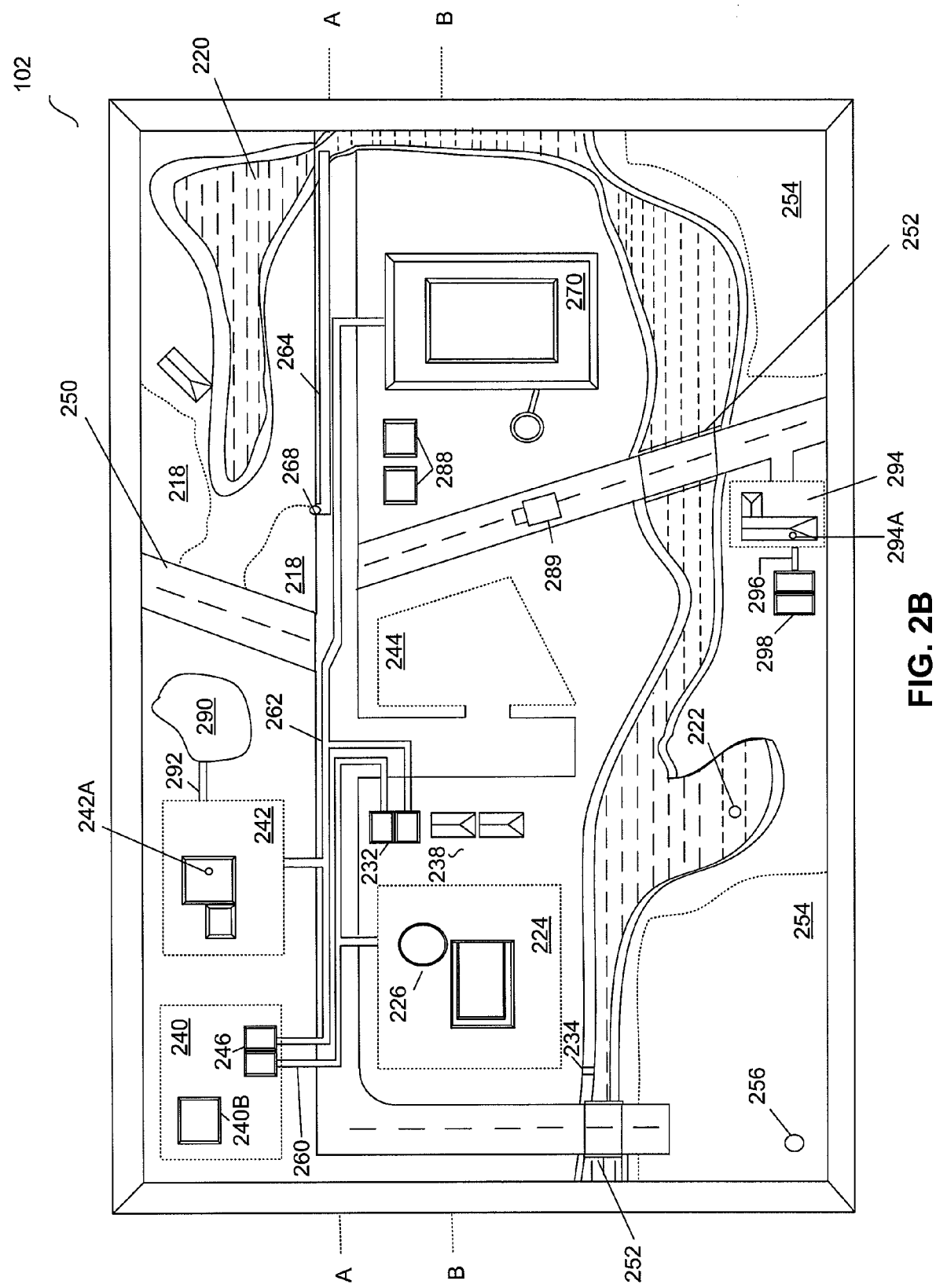

Referring to FIGS. 2A and 2B, top views of portable simulated water treatment model 102 are shown. Model 102 may simulate multiple terrains including, but not limited to, hills 218, body of water 220, and farmlands 224. Model 102 may also simulate city area 240 which may include, without limitation, models of city buildings 240A and 240B, businesses, malls, schools, restaurants, gas stations, hospitals, and the like. Model 102 may also provide simulated industrial area 242 which may include model factories, manufacturing plants, and so forth. Similarly, model 102 may provide residential areas 238 (with homes 238A, 238B, and 238C), 244, and 294 that may simulate urban areas, suburban areas, or rural areas. Each of the simulated residential areas may include model houses, such as cape houses, ranch houses, farm houses, and the like. Additionally, each of the simulated residential areas may include simulated buildings including, for example, malls, schools, restaurants, and the like.

One of ordinary skill in the art will recognize that the layout of the terrains on model 102 is an example layout. The terrains and simulated areas may be oriented in a different manner. Alternatively or in addition to, the model may only simulate some of the terrains and areas listed above, or may include other areas that require drinking water treatment and delivery and/or wastewater treatment.

In some embodiments, the model buildings (e.g., model city buildings, factories, homes for city area 240, industrial area 242, and residential areas 238, 244, and 294, respectively) may include inlets for demonstrating water flow to and from a building from and to a pipeline network, such as pipelines 260, 262, and 264 shown in FIG. 2B. For example, referring to FIGS. 2A and 2B, model building in industrial area 242 may include inlet 242A. Liquid added to 242 to may flow through the model building and may empty into pipeline 262 or wetland 290 via channel 292. Similarly, a home on rural area 294 may include inlet 294A that may be coupled to channel 296. Liquid added to inlet 294A may simulate the delivering of water to the home and/or may simulate the removal of wastewater via channel 296. The simulation of drinking water treatment and wastewater treatment is discussed in more detail below.

Model 102 may also provide model roadways 250A, 250B, 250C, 240D, and 250E (collectively roadways 250) and bridges 252. In some respects, some of the roadways and bridges may be detachable from model 102 to reveal, for example, the pipeline network 260, 262, and 264, as shown in FIG. 2B (where roadways 250B and 250D have been removed). In other respects, some of the roads 250 and/or bridges 252 may be formed integrally with model 102.

In one respect, portable simulated water treatment model 102 is constructed to model the sources of drinking water for city areas (240), rural areas (249), industrial area (242), residential areas 238 and 244, rural area 294, and the like. Model 102 may provide drinking water treatment plant 224 for simulating treatment of raw water (e.g., groundwater source via well 256 or from a body of water via pumping station 234), storage of treated drinking water in a water storage facility, for example water tower 226, and the delivering of the drinking water via drinking water pipeline 260.

In some embodiments, drinking water treatment plant 224 may include multiple treatment sections, such as, for example, treatment sections 228 and 230, shown in FIG. 4. Treatment sections 228 and 230 may be integrally formed into model 102. Alternatively or in addition to, treatment sections 228 and 230 may include removable trays that may be placed into model 102 during a simulation or demonstration. In some respects, treatment sections 228 and 230 may be used to simulate the treatment of the raw water including chemical processing, sedimentation, and filtering as described in more detail below.

Drinking water treatment plant 224 may also include a water tower storage facility, such as water tower 226, coupled to treatment section 230 for storing treated drinking water. The treated drinking water may be delivered, via drinking water pipeline 260 to various sources such as to a home, i.e., to water drinking tank 232A underneath home 238A or drinking water tank 246A underneath city building 242A, as shown in FIG. 4. One of ordinary skill in the art will understand the delivery of treated drinking water may extend to other portions on model 102 including industrial area 242, other residential areas, rural areas, and the like using for example pipeline 260. Alternatively or in addition, model 102 may model bottling of drinking of water in a facility and the delivering of the bottles to areas depicted by model 102.

For rural areas, portable simulated water treatment model 102 may simulate aquifers storing groundwater. In one respect, model 102 may include well 256 coupled to a groundwater source (e.g., layer 102a), as shown in FIGS. 2A, 2B, and 3A. Well 256 may include an outlet such that water may be drawn, using, for example, a syringe, pipette, or spray pump in order to simulate well water drawing. The drawn water may be used directly or may subsequently be provided to water treatment plant 224 for treatment.

Model 102 may also be constructed to model the treatment of wastewater from different sources. In one respect, model 102 wastewater treatment plant 270 receives wastewater via pipeline 262. Coupled to pipeline 262 are channels from different sources such as, but not limited to, city 240, industrial area 242, and residential area 238 (and in particular, sewage tank 232B underneath a home 238A or sewage tank 246B underneath city building 240A, as shown in FIG. 4).

In one respect, wastewater treatment plant 270 may include multiple treatment sections, such as, for example, treatment sections 272A, 272B, 274A, 274B, and 276. Each of these treatment sections may be formed integrally with model 102. Alternatively or in addition, each of the treatment sections may include removable trays that may be placed into model 102 during a simulation or demonstration. The treatment sections of wastewater treatment plant 270 may be used to simulate the treatment process of wastewater including the clarification stages, aeration stages, chemical processes, and the like, each described in more detail below.

In other respects, model 102 may simulate the treatment of wastewater using septic tank 298 for rural area 294. Using, for example, inlet 294A, simulated wastewater may be added and may flow through channel 296 to septic tank 298 coupled to channel 296.

Components of model 102 (e.g., model buildings, treatment plants, roads) may be formed integrally with model 102. Alternatively, the components may be removable and interchangeable. Details of wastewater treatment using a septic tank are discussed in more detail below.

Model 102 may also provide simulation components to simulate, among other things, raw water, wastewater, treatment process components (e.g., filters, "chemical" additives, etc.), valves, gates, and the like. Each of these components may be a non-toxic, non-poisonous, biodegradable component that are appropriate for use with children and are relatively easy to clean up and/or dispose. For example, to simulate wastewater, a mixture of cocoa powder, water, and rice grains are mixed together and added to the respective pipeline for simulation. Similarly, to simulate sludge, chocolate pudding, oatmeal, and water are added to the treatment sections of wastewater treatment plant 270. For simulating a gate or valve, clay, putty, or the like may be used. For simulating coagulants, gelatin mixed with a colored drink mix or colored water may be used. For simulating biosolids, cocoa alone or a mixture of cocoa, pudding mix and water may be used. For simulating wetland 290 or grass used over septic tank 298, green sponges or felt may be provided. For simulating soil in the septic field, tan felt may be provided. One of ordinary skill in the art will recognize other suitable substitutes.

Simulating and Demonstrating Drinking Water Treatment

In one embodiment, model 102 may simulate and demonstrate drinking water treatment from multiple sources and delivering the treated drinking water to areas, such as, for example, city 240, industrial park 242, and residential neighborhoods 238 and 244. For example, model 102 may simulate drawing raw water from body of water 220 and providing the water to water treatment plant 224. Alternatively, model 102 may simulate drawing groundwater sources and treated the water for use as drinking water.

In one respect, water or any other suitable non-toxic, biodegradable liquid may be used to fill body of water 220. Additionally, rain may be simulated using, for example, a spray bottle, to demonstrate the sources of water for body of water 220. In one respect, body of water 220 may be a lake, river, bay, ocean, and/or other surface water. While model 102 includes one body of water, it is noted that other simulated bodies of water may be provided to illustrate other possible sources of drinking water. Body of water 220 may include drain hole 222 that allows simulated body of water 220 to be drained after simulation. A stopper (not shown) may be provided for sealing drain hole 222 during a simulation. Model 102 may include container 118 (shown in FIG. 1) used to collect the liquids drained from simulated body of water 220.

To draw water from body of water 220, simulated pumping station 234 may be provided. A syringe or pipette may be used to draw the water from body of water 220 at pumping station 234 and may be provided to water treatment plant 224 for processing.

Alternatively, raw water from a groundwater source may be simulated, using for example, layer 102a that includes water or any other suitable non-toxic, biodegradable liquid. Referring to FIGS. 2A and 2B, well 256 may include an outlet that allows a syringe, pipette or spray pump to draw water from a groundwater source, layer 102a of model 102. The water drawn from well 256 may subsequently be provided to water treatment plant 224 for processing.

In one embodiment, referring to FIGS. 3B and 4, upon receiving the raw water, the treatment process is simulated using water treatment plant 224. Water treatment plant 224 includes water tower 226, and first and second treatment sections, 228 and 230. First treatment section 228, including portions 228a and 228b, may simulate where a chemical process occurs, e.g., the adding of coagulants to the drinking water for removing dirt and other particles that are suspended in the water. A simulated coagulant, such as gelatin or other non-toxic, biodegradable substitute attracts the contaminant particles that are suspended in the water to simulated floc. Further, first treatment section 228 may simulate sedimentation. In one respect, when more water is added to the water in portion 228a, via a spray bottle, syringe, or pipette, for example, the floc settles to the bottom of portion 228a and the substantially particle free water flows to portion 228b.

Second treatment section 230, including portions 230a and 230b, may simulate filtering of the water from first treatment section 228. A simulated filter, such as a cotton ball or the like, may be placed in portion 230a and the liquid from first treatment section 228 may be passed through the filter.

Further, second treatment section 230 may also simulate and demonstrate disinfecting the water. In one respect, "chlorine" mix, such as a colored gelatin or drink mix, may be added to portion 230b. Water from portion 230a will mix with the "chlorine" and may simulate the disinfection process generally used to kill any bacteria or microorganisms that may be present in the water. Once the water is purified, the water may flow to water tower 226 via channel 232. In one respect, a piece of clay simulating a valve or gate may be provided between water tower 226 and water treatment plant 224. When the water is clean and purified, the gate may be removed and stored in a water storage facility, such as water tower 226.

Referring to FIG. 2A, portable simulated water treatment model 102 may include simulated roadways 250 having bridges 252. Under the removable simulated roadways 250 (e.g., portions 250B and 250D) may be multiple channels that may be used to simulate pipeline network that may simulate, among other things, pipeline 260 used to deliver treated drinking water to areas of model 102.

In one respect, referring to FIG. 2B, pipeline 260 coupled to water tower 226 may be used to deliver water from the water tower to homes in residential area 238. In particular, pipeline 260 may deliver the treated water to drinking water holding tank 232A underneath, for example, home 238A, which is removed as shown in FIGS. 2B and 3B. Similarly, pipeline 260 may deliver the treated drinking water to drinking water holding tank 240A underneath city building 240A, which is removed, as shown in FIGS. 2B and 3B. One of ordinary skill in the art will recognize that pipeline 260 may extend to other areas (e.g., industrial area 242) of model 102 to demonstrate the delivery of drinking water to those areas.

For rural areas, portable simulated water treatment model 102 may simulate aquifers storing groundwater. In one respect, portable simulated treatment model 102 may include wells coupled to the groundwater source which may be simulated by use of syringes or hand-operated pumps.

Simulating and Demonstrating Wastewater Treatment

Referring to FIG. 2B, with roadways portions 250B and 250D, home 238A and city building 240A removed, multiple channels from various wastewater sources are coupled to a pipeline network that may simulate, among other things, the collection of wastewater and the treatment of the wastewater at a remote location. In one respect, the model may simulate collection of wastewater from city 240, industrial area 242, and residential area 238. In particular, wastewater from sewage waste line 232B from home 238A, sewage waste line 246B from city building 240A, and industrial area 242 collectively, may be feed into a stream via pipeline 262 and delivered to wastewater treatment plant 270. In one respect, public sewage pipeline 262 may simulate an actual sewage pipeline that is placed at a slope in the ground to aid in the transport of the wastewater. Additionally, wastewater pipes from these other sources may be included and may be coupled to public sewage pipeline 262 or may simulate to feed to wastewater treatment plant 270.

In one respect, referring to FIG. 5, wastewater treatment plant 270 may include portions 272A, 272B, 274A, 274B, and clarifier tank 276. To simulate wastewater, a combination of cocoa, rice, and water may be provided to public sewage pipeline 262. To simulate the treatment of wastewater, portable simulated water treatment model 102 may simulate a screening process, where a screen is placed at an interface between public sewage pipeline 262 and portion 272A. The screening simulation shows how solid objects within the waste stream are removed. Other substances may also be used to simulate wastewater and/or wastewater treatment components.

Next, a "sewage assist" comprising chocolate pudding, oatmeal, and water may be added to portions 272A, 272B (collectively settlement tank portions 272) to aid in the production of sludge. In some embodiments, portable simulated water treatment model 102 may simulate a primary clarification process where smaller solids clump together, settle on the bottom of settlement tanks 272A and 272B, creating "sludge." In some embodiments, this step may be performed prior to the simulation or demonstration.

In some embodiment, portable simulated water treatment model 102 may simulate aerators used to speed the growth of good microorganisms in the sludge. Using an eyedropper, pipette, or syringe at, for example, "aeration basin" 272B, bubbles may be created by depressing the eyedropper, pipette, or syringe. This may simulate air being pumped into the sludge. Once again, use of other substance is also acceptable.

Next, the simulated sludge may be lifted out of clarifier tank 276 and settlement tanks 272 using a spoon or cotton swab and either placed in the digester and/or thickening chamber and then placed in the lagoon to simulate biosolids or placed in or on the simulated incinerator building.

Portable simulated water treatment model 102 may also simulate biological treatment of the wastewater. In some embodiments, the aerated sludge and water combination may be provided to clarifier tank 276, via a channel 278 or other means. Here, model 102 simulates the further promotion of growth of good bacteria and other microbes that may break down the solid waste via a biological process. Additionally, the clarifier tank 276 further allows solids to settle at the bottom of the tank.

In other embodiments, portable simulated water treatment model 102 may simulate a disinfection process. Water from clarifier tank 276, being held by a gate or valve, simulated using clay, may be released into chlorination basin 274A when the gate is removed via channel 280. Chlorine, simulated using a colored gelatin (e.g., blue gelatin), may be added to chlorination basin 274A and a simulated disinfection process occurs, and in particular, changing the color of the wastewater. Once again, use of other substance is also acceptable.

The treated wastewater, also known as effluent, may be stored in basin 274B. The portable simulated water treatment model 102 may simulate the removal of chlorine and/or other chemicals in the treated water by adding a de-chlorination agent (specialized salts/chemicals), simulated by adding water and changing the color of the wastewater.

Subsequently, the effluent may be provided to a body of water. To simulate this, portable simulated water treatment model 102 may include outfall channel 282 coupled between basin 274B and body of water 220.

Alternatively, the effluent may be provided to green areas (e.g., golf courses, landscaping, etc.) for watering usage. As such, portable simulated water treatment model 102 may simulate other channels or pumping means to recapture and deliver the effluent.

For a private sewer system, waste disposal may be handled differently. This may be due to chemicals or other substances in industrial waste unsuitable for a wastewater treatment plant. Therefore, many factories are required to pre-treat their waste before discharging to the main sewer line for treatment. In some instances, many industrial companies go further and provide a finishing treatment on its pre-treated waste. They may use wetlands, such as wetland 290 shown in FIGS. 2A and 2B used to provide an additional pre-treatment technique.

In one embodiment, portable simulated water treatment model 102 may simulate the use of a wetland in industrial situations. To simulate waste, building 242A may include inlet 242A for receiving a simulated oil and sewage mixture (e.g., cocoa) which may subsequently flow to pipelines 262 and 292. In one respect, industrial park 242 may have a channel coupled to public sewage pipeline channel 262 and wetland channel 292 which may empty out to wetland 290, simulated by a sponge piece which filters the waste further prior to it flowing to pipeline 262.

For rural communities without access to either a public or private sewage line, a simulated septic system may be provided. Referring to FIGS. 2A and 2B, rural area 294 comprising a rural home may be coupled to septic system 298 via septic channel 296. In some embodiments, septic system 298 may include, amongst other things, a septic tank and a septic field. Portable simulated water treatment model 102 may simulate the use of a septic system by removing simulated grass (e.g. green felt) over the simulated septic system (tank and field) and then placing simulated soil (e.g. tan felt) in the simulated field of the septic system 298 and flowing simulated wastewater through opening 294A (situated directly over channel 296) in rural home 294, through septic channel 296 into the simulated soil in septic field of septic system 298. The simulated tank of septic system 298 may allow for solids to settle and liquid waste to flow through to the septic field.

Simulating and Demonstrating Sludge Disposal

As noted above, the treatment of wastewater produces sludge at the bottoms of the settlement tanks. Generally, the sludge is pumped into a thickening chamber for processing. In one embodiment, portable simulated water treatment model 102 may simulate the treatment of the sludge by providing thickening chamber 284 (simulated, for example, by a plastic vile). Sludge (thickened mixture of water, pudding mix, cocoa, and oatmeal) may be removed from settlement tank 272 and/or clarifier tank 276 and placed into thickening chamber 284 along with water. The sludge is subsequently pressed or spun (e.g., shaking chamber 284) to create a thickened sludge where, if any water escapes over the edge, that water is returned back to the treating process.

Portable simulated water treatment model 102 may provided the simulated thickened sludge to anaerobic digestion (simulated by a plastic vile with a cap) for storage. This process simulates the oxygen-free environment where microorganisms eat and digest the sludge. Additionally, this process simulates the production of reusable gas byproduct created by the anaerobic digesters.

In some embodiments, a simulation where the sludge is aerated using, for example, an eyedropper, pipette, or syringe that introduces air into the simulated sludge is performed. This simulates the conversion of the sludge into carbon dioxide, water, and nitrates.

Once the pathogens are removed from the sludge, referred to as biosolids, the biosolids may be used as a fertilizer or soil conditioner or may be provided to a lagoon. Alternatively, the biosolids may be disposed in landfills or stored for future use, in for example, lagoon 288, as shown in FIGS. 2A, 2B, and 5.

Alternatively, biosolids may be transferred to farmlands 254 for land applications, via truck 289. One of ordinary skill in the art would understand that biosolids may be used in other land applications such as forest areas, land mines, arid range land, and the like. Portable simulated water treatment model 102 may simulate each of these areas and may simulate roads and trucks for delivering the biosolids to such areas.

Simulating and Demonstrating Storm Water

In some embodiments, portable simulated water treatment model 102 may simulate how a storm drain functions. Referring to FIG. 2B, simulated water run off from hills 218 and roadways 250 may be collected at storm drain 268 and subsequently storm pipe 264 into body of water 220. One of ordinary skill in the art would recognize storm drain 268 may be placed at various locations on model 102 (e.g., near roads 250, residential areas 238, 244, city 240, etc.) to simulate the collection of liquids caused by storms and the like.

Additionally, in other embodiments, storm pipe 264 may be coupled with sewage pipeline 262, such that the storm water may be treated to illustrate a combined sewer system.

All of the methods disclosed and claimed can be made and executed without undue experimentation in light of the present disclosure. While the methods of this invention have been described in terms of embodiments, it will be apparent to those of ordinary skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope, and concept of the disclosure as defined by the appended claims.

What is claimed is:

1. A portable water treatment physical model, comprising:
   a physical simulation of a water source;
   a physical simulation of a drinking water treatment plant for simulating treatment of water from the simulation of the water source; and
   a physical simulation of a wastewater treatment plant coupled to the simulation of the drinking water treatment plant for simulating treatment of wastewater.

2. The physical model of claim 1, further comprising a physical simulation of a pipeline network coupled to the simulation of the drinking water treatment plant to simulate distribution of treated drinking water, and coupled to the simulation of the wastewater treatment plant to simulate collection of wastewater.

3. The physical model of claim 1, the simulation of the drinking water treatment plant comprising at least first and second simulated drinking water treatment sections.

4. The physical model of claim 3, the simulation of the drinking water treatment plant further comprising a simulated water storage facility coupled to the first and second simulated drinking water treatment sections.

5. The physical model of claim 4, further comprising a physical simulation of a pipeline network coupled to the simulation of the water storage facility to simulate distribution of treated drinking water.

6. The physical model of claim 1, the simulation of the wastewater treatment plant comprising a simulated settlement tank and a simulated clarifier tank.

7. The physical model of claim 6, the simulation of the wastewater treatment plant further comprising a simulated chlorination basin.

8. The physical model of claim 1, further comprising a physical simulation of a storm drain network for simulating passage of storm water to the simulation of the water source.

9. The physical model of claim 1, the simulation of the wastewater treatment plant being selected from the group consisting of a simulated municipal sewage treatment plant, a simulated private sewage treatment plant, and a simulated septic system.

10. The physical model of claim 1, further comprising a portable carrying case for holding the portable water treatment physical model during transport and storage.

11. A method for simulating water treatment processes, comprising:

providing at least one physical simulation of a body of untreated water;

providing a physical simulation of a drinking water treatment plant;

transferring water from the simulation of the body of untreated water to the simulation of the drinking water treatment plant;

simulating drinking water treatment to produce a physical simulation of a treated water source; and simulating storage of the simulation of the treated water source.

12. The method of claim 11, the step of simulating drinking water treatment comprising:

simulating a coagulation process, and;

simulating a disinfection process.

13. The method of claim 12, the coagulation and disinfection processes both being simulated using non-toxic substances.

14. The method of claim 11, further comprising, simulating distribution of the simulated treated water source.

15. A method for simulating water treatment processes, comprising:

providing at least one simulated physical simulation of a source of wastewater;

providing a physical simulation of a wastewater treatment plant;

transferring wastewater from the at least one simulation of the source of wastewater to the simulation of the wastewater treatment plant;

simulating filtering for removing solids in the simulation of the wastewater to produce simulated filtered wastewater;

simulating settling with said simulation of the filtered wastewater to produce simulated separated wastewater and simulated sludge;

simulating clarification of said simulated separated wastewater to produce simulated clarified wastewater; and simulating disinfection of said simulated clarified wastewater to produce simulated treated wastewater.

16. The method of claim 15, further comprising simulating aeration within said simulation of the wastewater treatment plant.

17. The method of claim 15, further comprising, discharging said simulated treated wastewater into a physical simulation of a body of water.

18. The method of claim 15, further comprising, distributing said simulated sludge on a physical simulation of land.

19. The method of claim 15, the transferring step further comprising, passing said simulation of the wastewater from said at least one simulation of the source of wastewater to said simulation of the wastewater treatment plant through a physical simulation of a sewage pipeline network.

20. The method of claim 15, the filtering, settling, clarification and disinfection steps being simulated using non-toxic substances.

* * * * *

UNITED STATES PATENT AND TRADEMARK OFFICE
CERTIFICATE OF CORRECTION

| | |
|---|---|
| PATENT NO. | : 8,043,094 B2 |
| APPLICATION NO. | : 11/456463 |
| DATED | : October 25, 2011 |
| INVENTOR(S) | : Carlene T. Bahler |

Page 1 of 1

It is certified that error appears in the above-identified patent and that said Letters Patent is hereby corrected as shown below:

In claim 15, column 13, line 23, delete "simulated".

In claim 15, column 13, line 27, insert --simulated-- between "transferring" and "wastewater".

Signed and Sealed this
Twenty-seventh Day of December, 2011

David J. Kappos
*Director of the United States Patent and Trademark Office*